US00RE40078E

(19) United States
(12) Reissued Patent
Dutta et al.

(10) Patent Number: US RE40,078 E
(45) Date of Reissued Patent: Feb. 19, 2008

(54) DEMAND-BASED POWER AND DATA RATE ADJUSTMENTS TO A TRANSMITTER TO OPTIMIZE CHANNEL CAPACITY AND POWER USAGE WITH RESPECT TO DATA TRANSMISSION TRAFFIC OVER A FIXED-BANDWIDTH CHANNEL

(75) Inventors: Santanu Dutta, Vienna, VA (US); Richard J. Mahany, Swisher, IA (US)

(73) Assignee: Mobile Satellite Ventures, LP, Reston, VA (US)

(21) Appl. No.: 11/485,649

(22) Filed: Jul. 13, 2006

Related U.S. Patent Documents

Reissue of:
(64) Patent No.: 5,982,813
Issued: Nov. 9, 1999
Appl. No.: 08/723,406
Filed: Sep. 30, 1996

(51) Int. Cl.
*H04B 1/38* (2006.01)
*H04L 27/04* (2006.01)
*H04L 12/04* (2006.01)

(52) U.S. Cl. ..... 375/219; 375/295; 375/377; 370/232; 370/468

(58) Field of Classification Search ..... 375/219–222, 375/225, 259, 295, 377; 370/231–235, 465–468
See application file for complete search history.

(56) References Cited

U.S. PATENT DOCUMENTS

| | | | | |
|---|---|---|---|---|
| 5,115,429 | A | | 5/1992 | Hluchyj et al. |
| 5,452,009 | A | | 9/1995 | Citta |
| 5,463,656 | A | | 10/1995 | Polivka et al. |
| 5,471,497 | A | | 11/1995 | Zehavi |
| 5,475,711 | A | | 12/1995 | Betts et al. |
| 5,630,212 | A | * | 5/1997 | Ben-Efraim ..... 455/127.2 |

* cited by examiner

*Primary Examiner*—Don N. Vo
(74) *Attorney, Agent, or Firm*—Antonelli, Terry, Stout & Kraus, LLP.

(57) ABSTRACT

In a communication system in which a transmitter transmits data over a communication channel of a fixed bandwidth to a receiver, the method according to which the transmit data rate is continuously adjusted to a rate which is substantially equal to a short-term average data rate. The channel capacity and/or other characteristics of the system, is continuously adjusted, through changes in transmit power, symbol rate and modulation format, to a level at which the ratio of received signal energy per bit to noise spectral density ($E_b/N_0$) at the receiver is close to but above its minimum acceptable level, thereby matching the channel capacity and/or other characteristics of the system to the traffic. The system has further attributes which adjust the transmit data rate responsive to conditions involving at least one of data traffic levels, power reserve emergency, thermal load and message priority.

10 Claims, 10 Drawing Sheets

DEMAND-BASED POWER AND DATA RATE ADJUSTMENTS TO A TRANSMITTER TO OPTIMIZE CHANNEL CAPACITY AND POWER USAGE WITH RESPECT TO DATA TRANSMISSION TRAFFIC OVER A FIXED-BANDWIDTH CHANNEL

Matter enclosed in heavy brackets [ ] appears in the original patent but forms no part of this reissue specification; matter printed in italics indicates the additions made by reissue.

BACKGROUND OF THE INVENTION

This invention relates generally to wireless communication systems and more particularly to channel capacity and power management in variable rate data transmission systems transmitting over a fixed-bandwidth communication channel.

The invention finds application in prior art radio frequency communication systems operating over one or more communication channels of fixed bandwidth. When such systems are used for data communication, they may be configured to communicate data at a predetermined data rate, modulation format, error-correction-coding, and other transmit waveform characteristics that determine the so called "common air interface" of the radio frequency communication system.

The transmit waveform and the prevailing additive noise in the channel determine the capacity of the channel for carrying information. In selecting the transmit waveform characteristics, it is usually the objective of the network service provider to provide an installed channel capacity that is sufficient to meet the peak traffic load, which may be characterized by an average source data rate. It is also an objective of the network service provider to guarantee a minimum error performance at the message destination. The destination error performance is usually measured by metrics such as bit error rate or message error rate. Shannon's theory lays down the theoretical foundation of a quantitative measure of channel capacity as $$C=B[1+(S/N)] \tag{1}$$

C: channel capacity in bits/second (bps)
B: channel bandwidth in Hz
S: received signal power in watts
N: received noise power in watts in the detection bandwidth
It is known [Carlson, A. B., Communication Systems: An Introduction to Signals and Noise in Electrical Communications, Mc-Graw-Hill, 1968, p. 354] that the Shannon capacity theorem leads to the following relationship between the minimum required $E_b$/N0 and the average source data rate, R:

$$E_b/N_0=[2^{(R/B)}-1]/[R/B] \tag{2}$$

where $E_b/N_0$ is the ratio of the received signal energy per bit of information to the single-sided nose power spectral density.

FIG. 1 shows a plot of equation (2). This plot shows the theoretical limit of minimum $E_b/N_0$ for a given R/B ratio, as well as the $E_b/N_0$ required by a number of practical prior art coding and modulation schemes. As shown in the plot, the right-half plane is referred to as the bandwidth limited region, where R/B tends to infinity, indicating that indefinitely high data rates can be accommodated with a fixed bandwidth channel but at the expense of indefinitely high transmit power, or $E_b/N_0$. In contrast, the left-half plane is referred to as the power limited region, where $E_b/N_0$ can be reduced down to a theoretical limit of −1.6 dB in exchange of very high channel bandwidths for a given R, or vanishingly small R/B ratios.

According to Shannon's theory, as long as the $E_b/N_0$ is above that given by equation (2), for a given ratio of (R/B), error free communication is possible. While Shannon's theorem indicated the ultimate performance bound for a communication system, it did not indicate the specific means of achieving, or approaching, the ultimate performance. It has been the objective of communication system designers to invent specific, practical means for approaching the Shannon capacity.

A noteworthy feature of FIG. 1 is that moving toward the left extremity of the graph, that is operating at very low $E_b/N_0$ with low R/B, requires increasingly complex error-correction coding schemes, referred to here simply as "coding schemes", such as low rate convolutional coding with sequential decoding. In contrast, moving toward the right extremity of the graph requires the use of more complex modulation schemes, such as multilevel PSK modulation, referred to as MPSK, where the number of levels, M, typically takes on values of $2^n$, that is 2, 4, 8, 16, an so on.

Independent of Shannon theory, another theoretical limitation governs high speed data transmission through bandlimited channels; this limitation is defined by Nyquist theory. Nyquist theory states that the maximum symbol rate of a bandlimited channel, of bandpass, bandwidth B Hz, or lowpass equivalent bandwidth B/2 Hz, is B symbols/second. For example, using 6 kHz spaced mobile satellite channel, the maximum symbol rate supportable by such a channel is 6000 symbols/second.

Before considering the implication of Nyquist theory, it is useful, first, to review the formal definition of a symbol, or channel symbol, in digital communication systems. A symbol is a waveform of finite duration, belonging to a set of finite size, where each member of the set carries a predetermined number of bits of information. For example, 8PSK symbols are sine waves of a fixed amplitude and variable phase, where the phase can take one of 8 values. By virtue of the 8 possible phases of each 8PSK symbol, 3 bits of information are carried by each 8PSK symbol. If error-correction coding is used, the number of bits of information conveyed by each symbols is reduced by a redundancy factor equal to the coding rate.

Returning to the discussion of Nyquist theory, any attempt to transmit symbols at a rate higher than the Nyquist rate of B symbols/second, where B is the bandpass channel bandwidth, results in intersymbol interference, wherein the decision process for detecting the bits carried by each symbol is affected by the energy in adjacent symbols. It is extremely difficult if not practically impossible to transmit symbols through a bandlimited channel at the Nyquist rate as it requires the use of ideal channel filters of bandpass bandwidth B Hz, or lowpass equivalent bandwidth B/2 Hz, having infinitely sharp spectral roll-off. Such filters are referred to as a "brick wall" filters and are physically unrealizable. However, it is practically feasible to approach the Nyquist transmission rate with minimal intersymbol interference by using physically realizable, transmit and receive filters having a particular transfer function referred to as the Nyquist response, known in the prior art. Such Nyquist filters have finite spectral roll-off characteristics and lowpass-equivalent bandwidths that are greater than the B/2-Hz lowpass-equivalent bandwidth of the ideal, brick wall, filter. The excess bandwidth, of a practical Nyquist filter, expressed as a ratio relative to the bandwidth of the ideal brick wall filter, is an important parameter in the design of high speed data transmission systems through bandlimited channels. For example, if W is the bandwidth of L a practical Nyquist filter, the excess bandwidth factor is given by [{W−(B/2)}/(B/2)]. Typical excess bandwidth factors of practical systems range from 100% to 50%. Clearly, the lower the excess bandwidth factor, the greater is the symbol rate for a channel of given bandwidth.

Prior art communication systems have not been known to use transmitter power, modulation format or error-correction coding in a dynamic manner, to match the channel capacity to the average source data rate. Most often, a fixed channel capacity is installed, matched to the expected peak traffic load, leading to the existence of underutilized capacity during off-peak times. Some instances are known, however, such as "bandwidth on demand" systems, where channel bandwidth is used dynamically to accommodate time varying traffic.

In most communication systems, message traffic does not flow at a constant level. To the contrary, it is well known, and observed in most communication applications, that message traffic is sporadic, and typically cyclic over a day's period. Current systems appear to be deficient in ways of dynamically matching the channel capacity in general and transmit power in particular to actual, time variable traffic demands on the systems. Many satellite communication systems use leased space segment capacity, whereby satellite channels are leased from the satellite owner at a price determined by the amount of power and bandwidth used. For such systems, operating costs on a "per kilobyte of traffic" basis typically reflect power usage at maximum traffic loads and are, consequently, higher than necessary because of inherent inflexibilities in adjusting the power levels and other aspects of the transmit waveform to the traffic loads on such systems.

SUMMARY OF THE INVENTION

A general object of the invention is to provide for a communication system, operating over channels of fixed bandwidth, methods for adapting the channel capacity of the system so as to match the actual message traffic levels of the communication system.

A more specific object of the invention is to achieve the said channel capacity adaptation of the said, fixed bandwidth, communications system by adjusting the transmit power of a transmitter, which is a component of the said communications system, so as to match current message traffic demands.

An additional object of the invention is to achieve the said channel capacity adaptation of the said, fixed bandwidth, communications system by adjusting the modulation formats of a transmitter, which is a component of the said communications system, so as to match current message traffic demands.

It is yet another object of the invention to optimize power usage by a transmitter to minimize costs of data transmission over a fixed-bandwidth communication channel.

The invention also teaches means of realizing a variable-modulation-order demodulator for MPSK signals, where the modulation order, M, is selectable by the transmitter and is unknown to the receiver.

A method, according to the invention, pertains to the operation of a communication system in which a transmitter of data messages transmits over a communication channel of fixed bandwidth. The method is an improvement which adjusts the power of the transmitter to an optimum power level based on current traffic demands in the system. The modulation format may be altered, concurrently, if required by the ratio of average source data rate to the channel bandwidth. The data rate on the channel is adjusted to meet a current traffic demand. The transmitter power and modulation format are selected so that a ratio of signal energy per bit to a noise power spectral density at a corresponding receiver remains marginally above a threshold level which guarantees a minimum bit-error-rate performance.

An advantage of the described method is that it is performed continuously during the operation of the transmitter to meet a continuously varying traffic demand on the system.

Another advantage of the method is that the transmit power remains substantially at an optimum at all times, meaning that the transmit power remains at a lowest possible level, considering the current traffic demand on the channel and a necessity to maintain a data error rate below a threshold level.

Other features and advantages will become apparent from the detailed description set forth below.

BRIEF DESCRIPTION OF THE DRAWING

The detailed description of a preferred embodiment of the invention may be best understood when it is read in reference to the appended drawing in which.

DETAILED DESCRIPTION

Figure 2:
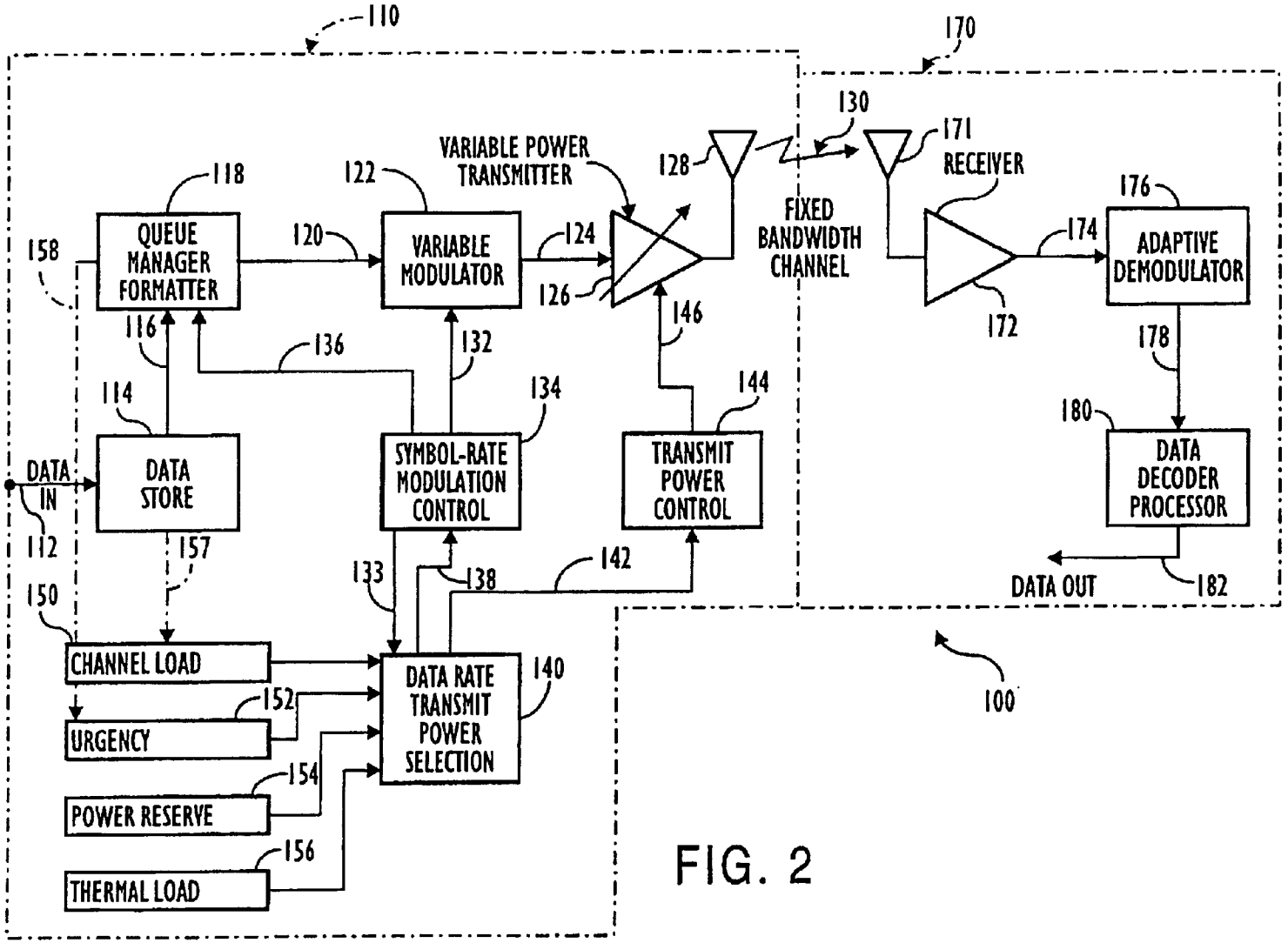
FIG. 2 is a simplified schematic representation of a communication system featuring a transmitter and a receiver, which include features of, and which operate in accordance with, the present invention.

Referring now to FIG. 2, there is shown a schematic diagram of a communication system which is designated generally by the numeral 100. Features and advantages of the present invention will be described in reference to the communication system 100. It is understood that data may be received for transmission by the system 100 from any number of data sources, which may be colocated with the transmit subsystem 110, or located remotely and connected to the transmit subsystem via standard, fixed data links. The data sources, and their links with the transmit subsystem 110 are not separately shown. In the preferred embodiment, a transmit subsystem 110 is depicted to receive data, which may be data messages having a given length, as a data input via a data port (DATA IN) at 112. Any desirable data source or number of data sources may be coupled to the data port 112. In this regard, the physical data port 112 represents typical data input provisions, such as standard telephone connectors, and parallel or serial data connectors, capable of transferring received data to a communication interface and storage module (DATA STORE) 114. As an example, the data port 112, may represent and include a plurality of connected fixed lines for simultaneously receiving a plurality of messages, even from different origins. The data are, consequently received by the transmit subsystem 110 through the data port 112 as input data messages at a determinable average source, or input, data rate. It should be realized that for most practical systems, from a statistical viewpoint, the average input data rate of received messages, averaged over some suitable observation period, such as one hour may be variable with time, such as the time of day.

The communication interface and storage module 114 includes a typical interface having a corresponding capability of receiving data inputs through one or a plurality data input lines. The interface function of the communication interface and storage module 114 includes typical switching circuits with a known capability of receiving a number of messages simultaneously from any such input devices over the data port 112, as may be coupled thereto. A storage capacity of the communication interface and storage module 114 comprises typical data storage capacity, such as typical semiconductor memory or magnetic storage. Upon receipt of data messages, the communication interface and storage module 114 temporarily stores received data messages in its memory for further processing.

A particular type of the communication system 100, to which the present invention applies, is known as a "store-and-forward" communication system. In such a system, received data are not immediately transmitted upon receipt, but instead may remain temporarily stored in memory, such as in the memory of the communication interface and storage module 114, to be further processed into data packets which will ultimately be transmitted. Temporary storage also permits momentary traffic loads to be accommodated without causing catastrophic system failures. A queue manager and data formatter module (QUEUE MANAGER FORMATTER), hereinafter queue manager 118, is coupled at 116 to the communication interface and storage DATA STORE module 114 to remove received data from the module 114 and format the data into data packets which may then be transmitted.

The queue manager 118 forwards such data packets, as shown at 120, to a VARIABLE MODULATOR module 122 that is under the control of the SYMBOL RATE/MODULATION CONTROL module 134. The variable modulator 122 performs a number of key functions. In addition to modulation, it also performs any forward error correction and symbol framing that may be called for in the communication system architecture. Information about modulation format and symbol rate are provided to module 122 by SYMBOL RATE/MODULATION CONTROL module 134. While it is possible to have variability in the type of modulation itself, such as FSK, PSK and QAM, it is preferable, for demodulation simplicity, to keep the modulation type fixed and vary only the order of the modulation. The preferred embodiment uses Nyquist-filtered differential MPSK, where "M" denotes the number of levels, or order, of the modulation. M also denotes the number of allowed phases in the signal constellation. Typical and preferred values of M are $2^n$, where n is an integer; that is, n takes on values such as 2 (denoting BPSK), 4 (denoting QPSK) and 8 (denoting 8PSK). Although the preferred embodiment uses differential modulation, coherent modulation may also be used, according to exactly the same methods taught above. The difference between differential and direct encoding of phase in MPSK modulation is well known in the art and is not discussed here. The specifics of implementing Nyquist-filtered MPSK modulation, of a given symbol rate and order, are not described either as they are well established in the present art.

Again in reference to FIG. 2, the output signal, at 124, from the variable modulator 122 is a modulated analog signal which is passed to a variable power transmitter 126. The variable power transmitter 126 converts the modulated carrier signal to an RF modulated carrier signal and boosts the power of the RF modulated carrier signal for transmission thereof from a transmit antenna 128 over a communication channel of fixed bandwidth, as shown at 130. The above description represents the "upconversion" approach to transmit modulation. It is also possible to implement direct modulation of the RF carrier without departing from the methods taught here, that is, by implementing direct modulation with variable modulation-order and symbol rate.

The operation of the variable modulator 122 of modulating data at different rates and modulation formats onto the carrier wave, as described above, is controlled by a digital signal input at 132 from a SYMBOL-RATE/MODULATION CONTROL module 134. Module 134 decides on the modulation format and the transmit symbol rate to be used by the variable modulator 122, based on a knowledge of the required transmit data rate, the available modulation formats and the available channel bandwidth. The basis of the selection is described below.

In the applications of primary interest to this invention, the channel bandwidth is fixed. Knowledge of this channel bandwidth is either embedded in module 134, or communicated to it by an overall transmit-subsystem management system, which is not shown in FIG. 2 as its functions are not relevant to the main teachings of this invention.

It is advantageous for a designer of a high speed data transmission system, utilizing a bandlimited channel of fixed bandwidth, to optimize his system, concurrently, from a Shannon and a Nyquist standpoint, and further, to do so adaptively, thereby tracking the source traffic level with the installed capacity. The adaptation rule for such concurrent, or joint, optimization is described below.

Let $R_c$ be the selected channel, or transmit, data rate in bits/second. $R_c$ is selected by module 140 (DATA RATE/TRANSMIT POWER SELECTION) and communicated to module 134 via input 138. Let W be the desired bandpass, or double sided, bandwidth in Hz of the transmit signal. W is upper bounded by the bandpass channel bandwidth B, and is typically less than B by a predetermined guard band. Let X be the excess bandwidth factor, described in the Background, expressed as a fraction less than 1.0. Further, let $X_{min}$ be the minimum value of X that is allowed by the communication system design, based on the practical realizability of the receive demodulator. For data rates $R_c$ less than approximately B/2, it is not necessary to employ modulation orders greater than 2, that is M greater than 2 in MPSK. For any given $X_{min}$ the maximum transmit symbol rate $R_{smax}$ is given by:

$$R_{smax}=W/(1+X_{min}) \tag{3}$$

As long as $R_c$ is less than $R_{smax}$, it is possible to operate with binary modulation schemes, or M=2 in the MPSK modulation scheme of the preferred embodiment. For $R_c$ greater than $R_{smax}$, higher order modulations are selected. In the preferred embodiment, this corresponds to M greater than 2 and one of the values, $2^n$=4, 8, 16, etc., where n is an integer. The value of M=4 is the first step beyond M=2, M=8 is the next step, and so on. The decision to select the next value of M, in the progression described above, is based on comparing ($R_c$/n) with $R_{smax}$ given by equation (3) above. When ($R_c$/n) exceeds $R_{smax}$, M must be increased to the next higher value.

The above description teaches the rule used by the module 134 (SYMBOL RATE/MODULATION CONTROL) for selecting the symbol rate and modulation order for a desired transmit data rate, with a fixed bandwidth transmission channel. These selected values, or parameters, are communicated to the variable modulator 122 through the coupling 132 for use in the modulation process. The selected symbol rates and modulation parameters are also communicated to module 140 (DATA RATE/TRANSMIT POWER SELECTION) via coupling 133.

It should be realized that, ideally, a change in the transmit data rate would also necessitate a change in the rate at which data are read from memory by the queue manager 118 to be formatted into data packets prior to modulation. The data rate control module 134 therefore preferably controls also the formatting rate of the queue manager 118, as indicated by a data rate input signal 136 to the queue manager 118.

The selection control module 140 contains some of the key intelligence involved in the adaptive setting of the installed channel capacity. The parameters selected by module 140 are a transmit information rate, which is used interchangeably in this description with transmit data rate, and a transmit power. The choice of transmit data rate is communicated to SYMBOL RATE/MODULATION CONTROL module 134 via link 138, while the transmit power is communicated to TRANSMIT POWER CONTROL module 144 through link 142. The choices of transmit data rate $R_c$ and transmit power $P_T$ are related, as described below.

The decisions made by the SYMBOL RATE/MODULATION CONTROL module 134 regarding the choices of modulation format and symbol rate are received by module 140 via link 133. Module 140 contains a stored look-up table of minimum $E_b/N_0$ versus modulation format, as depicted for some cases of MPSK in FIG. 1 and FIG. 8. Using this look-up table, module 140 determines the minimum $E_b/N_0$ required for the selected modulation format. As $N_0$ is usually quite predictable in satellite communications, being determined primarily by receiver noise figure, the minimum required $E_b$ can be estimated by the transmitter from the threshold value of $E_b/N_0$. The receive desired-signal power S at the destination receiver IF output is given by $$S=E_bR_c \tag{4a}$$

Figure 8:
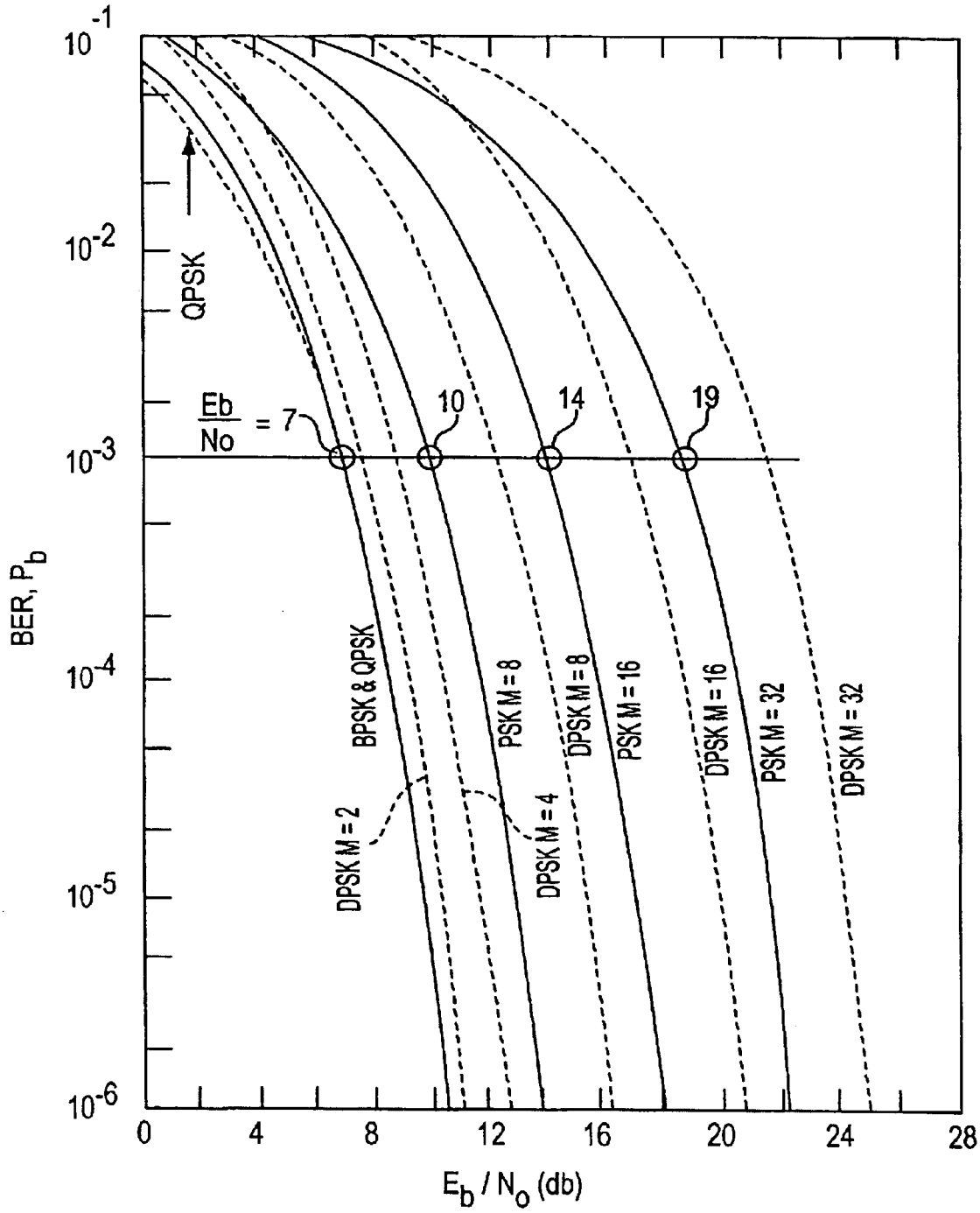
FIG. 8 shows a graphic illustration of a number of MPSK modem performance plots in which bit error rates are plotted against the ratios of signal energy per bit to the noise power spectral density.

The required transmit power is given by $$P_T=S/L \tag{4b}$$

where L is the link propagation loss. L is typically known to the transmitter, or can be estimated within certain accuracy bounds. In mobile satellite systems, such accuracy bounds are quite tight. Thus, through the above discussion, a method is shown for setting the transmit power from a knowledge of the modulation format. This method is used by module 140 to select the transmit power value communicated to TRANSMIT POWER CONTROL module 144 via coupling 142. Although MPSK is the preferred embodiment and is used as an example, the control means taught here are not limited to a specific modulation type. Every digital modulation format has a characteristic bit-error-rate (BER) versus $E_b/N_0$ relationship, sometimes referred to as the "modem curve". FIG. 8 shows examples of such modem curves. Given a BER performance objective, the minimum $E_b/N_0$ can be read off from the modem curve and entered in the look-up table refereed to above.

Figure 1:
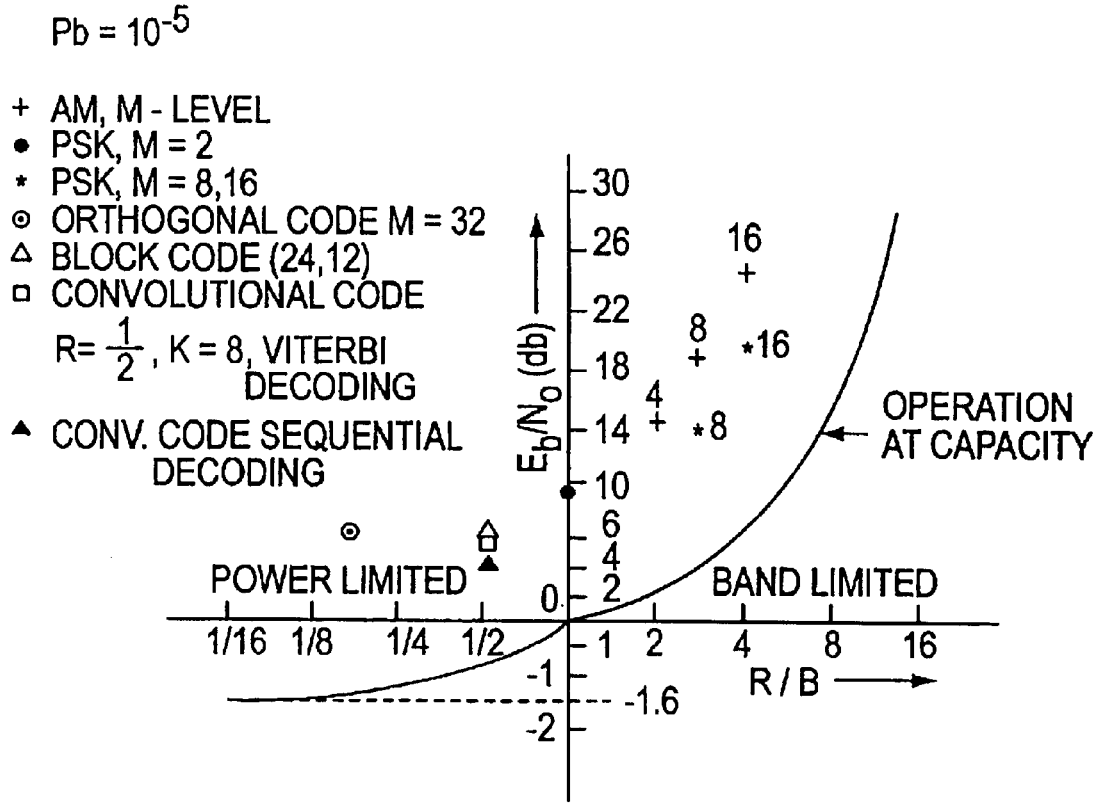
FIG. 1 PRIOR ART
FIG. 1 is a plot of equation (2), representing prior art knowledge, based on the Shannon capacity theorem, of the theoretical minimum $E_bN_0$ for any given ratio of average source data rate, R, to channel bandwidth, B.

It may appear from the Background discussion that trading transmit power for data rate, while keeping the modulation format and, hence, $E_b$ fixed, does not track the Shannon capacity curve of FIG. 1 very closely. In fact, the above approach traces a horizontal trajectory, or locus, moving left and away from the Shannon capacity curve as the transmit data rate is reduced for a fixed channel bandwidth. Keeping close to the Shannon capacity curve for reducing $R_c$/B ratios less than 0.5 requires the use of lower rate error-correction coding schemes. Adaptive use of multiple rate coding schemes involves considerable complexity and cost and is not a part of the preferred embodiment. In the preferred embodiment, when the average source $R_c$ data rate drops below $R_{smax}$, the modulation format M is held fixed at M=2, the coding rate is kept fixed, as at all times, and the transmit power $P_T$ is reduced proportionally to $R_c$ according to equations 4(a) and 4(b).

Having discussed the relationship between the settings of transmit data rate and transmit power, we now explain how other inputs to selection control module 140 determine the selection of data rate. The transmit data rate is normally determined by the traffic load but, under exceptional circumstances such as power reserve emergency or high message priority, the transmit data rate can be set by other requirements independent of the user traffic load.

The operation of the selection control module 140 to select a transmit data rate and a corresponding transmit power setting is based on inputs from a number of status indicators. The status indicators preferably include a channel load indicator (CHANNEL LOAD) 150, a message urgency indicator (URGENCY) 152, a power reserve indicator (POWER RESERVE) 154 and a thermal load indicator (THERMAL LOAD) 156. The channel load indicator 150 provides the selection control module 140 with a measure of the traffic load to which the transmitter will be subjected. Under normal operation of the transmit subsystem 110, the channel load indicator will be the primary indicator for the selection control module 140 in making determinations as to optimum data rates and corresponding transmit power settings. Traffic load is measured by a metric referred to as the average source data rate, which is given by the number of bytes of messages received by module 114 (DATA STORE), from all sources, in a predetermined observation period, for transmission over the radio communication system 100. For the dynamics of typical usage, for example dispatch center to mobile truck communications, 10 minutes has been found to be a typical observation period for determining the average source data rate. The requirements determining the observation period length are as follows. The observation period must be greater than a minimum value such that excessively frequent changes in transmission parameters are avoided. The observation period must also be less than a maximum value to (a) ensure good tracking of traffic dynamics and (b) ensure that message storage module 114 does not suffer from memory overflow owing to an excessively rapid increase in traffic.

The communication interface and storage module 114 provides an advantageous measuring point for traffic loads.

A preferred way to determine traffic loads is to collect message traffic data, as messages are received via the data port 112 at the communication interface and storage module 114. Data messages are typically preceded by a message header designating the length of the message. An accumulation of the message lengths in bits, over all input messages and over a predetermined observation period, divided by the duration of the observation period in seconds, provides the average source data rate in bits/second, which, as described above, is the preferred metric for traffic load.

The message urgency indicator 152, an additional input to the selection control module 140, indicates a special condition which may require a temporary deviation from the above-described normal operation of the transmit subsystem 110. A message of special urgency may have been received by the communication interface and storage module 114. The urgency of the message may be indicated by a special, priority identifying code which may be interpreted, for example, by the queue manager 118. The queue manager 118 will move the received message of urgency to the head of the queue and signal, via signal line 158 to the message urgency indicator 152, that such a message of special urgency has been received. When the selection control module 140 detects an urgency condition through the message urgency indicator 152, and the transmit data rate, modulation order and transmit power settings are currently not at maximum settings, the selection control module 140 generates control signals which temporarily increase such settings to maximum operating levels. From the viewpoint of installed channel capacity, the capacity is temporarily increased to the maximum permissible level to transmit the urgent message in the minimum possible time. While the above description corresponds to a binary scenario involving urgent and non-urgent messages, the methods taught here apply equally to scenarios involving a plurality of urgencies, with a plurality greater than two. In such scenarios, three or more urgency levels would exist, ranging from a minimum to a maximum, requiring the use of a corresponding number and levels of installed channel capacities.

The power reserve indicator 154 is another indicator which may temporarily cause a deviation from normal operations of the transmit subsystem 110, as previously described. The power reserve indicator monitors the status of the energy source which powers the transmit subsystem 110. When the transmit subsystem 110 is part of a fixed base station and operates normally with an unlimited line energy source, power emergencies affecting the entire base station facility may taken on proportions in which the additional load of RF transmission power may be insignificant. In such situations, optimizing the RF transmit power is irrelevant. However, the methods described herein are believed applicable to communication systems, such as the system 100, which may be operable under various conditions and circumstances. The power reserve indicator 154 is believed to take on significance primarily in remote, unmanned systems in which an emergency may temporarily cause a loss of a provided energy source, to make it necessary to assign priorities to any remaining power. In such case it may be desirable to operate the transmit subsystem 110 on emergency power for emergency transmissions only.

When the power reserve indicator 154 indicates a power reduction emergency, the selection control module 140, by interpreting the emergency signal from the power reserve status indicator 154, generates respective control signals for reducing the data rate and the transmit power to conserve power within the system 100. If the transmit subsystem 110 is a battery operated unit, such as a hand-held or a truck-mounted unit, the power reserve indicator 154 may generate the power conservation signal at any time when the battery voltage drops below a safe operating level.

The thermal load indicator 156 is a further safety status indicator which monitors a thermal load on the transmit subsystem 110 and generates an emergency signal when the monitored thermal load exceeds a predetermined safe limit, such that, when the current load continues to exist for any extended period, a system failure may result. In view of such an indication, the selection control module 140 generates control signals over signal lines 138 and 142, causing respective reductions in operational symbol rates and modulation order by the SYMBOL RATE/MODULATION CONTROL module 134 and in the transmit power as set by the TRANSMIT POWER CONTROL MODULE 144. It should be understood that the described operation of the transmit subsystem 110 is part of a system operation and, for instance, the selection control module 140 and the communication interface and storage module 114 may further be under system control and in communication with other system components or modules which may make up a particular system of choice. Regarding such interaction, the selection control module 140 and the communication interface and storage module 114 may be monitored, and further message traffic via the data port 112 may be stopped, or reduced, during any periods of the discussed special or emergency conditions.

The transmit subsystem described above involves fully automatic adaptation of transmit data rate, transmit power, symbol rate and modulation order, or level, in response to time varying input traffic and other conditions. In addition to the enabling means of automatic adaptation, it should be understood that equally key contributions of the present invention, are (a) teaching the benefits and demonstrating the feasibility of adapting the installed capacity of a communications channel to a time varying traffic load, and (b) the rules for selecting transmit power, symbol rate and modulation formats to implement such adaptation in a practical, cost effective manner. The adaptation of installed capacity may be implemented manually, by human operators performing the functions of data rate, transmit power and modulation order selection, following substantially the same selection rules as taught here. Such manual implementations of the transmit subsystem 110 would be considered within the scope of the present invention.

Receiving the modulated data transmission signal over the fixed bandwidth channel is a receive subsystem 170 having a receiver 172 which obtains its input from an antenna 171. The received RF signals comprise an analog input via signal line 174 to an adaptive demodulator module (ADAPTIVE DEMODULATOR) 176. The adaptive demodulator 176 includes a typical analog to digital signal conversion stage which converts the real analog received signals to complex baseband, that is inphase I and quadrature Q, digital signals, and a digital signal processor "DSP" which extracts the transmitted data from the digital signals.

The adaptive demodulator 176 senses the variable waveform characteristics of symbol rate and modulation format, selected by the transmit subsystem 110. The symbol rate may be sensed by one of several prior art symbol synchronizations DSP algorithms based on sensing the rate of phase transitions in an MPSK signal.

The adaptive demodulator 176 also estimates the modulation format. In the preferred embodiment, modulation format variations are restricted to variations in M, or modulation order, in filtered MPSK. Two means of estimating M are taught in this invention, as described below.

Figures 2, 5A:
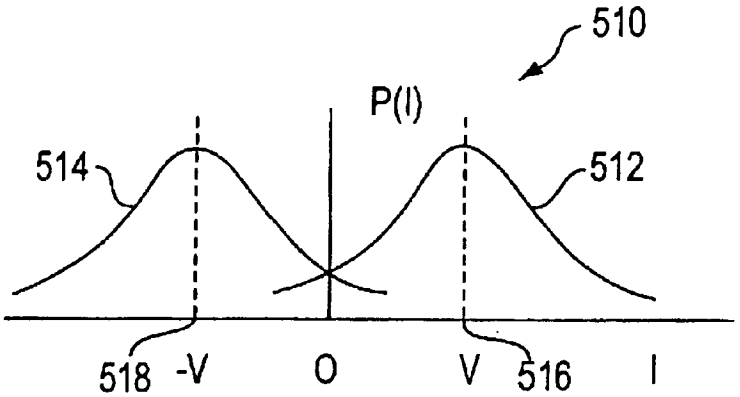
FIG. 5(a)-5(c) show signal constellations and complex baseband amplitude histograms as used in the variable-modulation-order MPSK demodulators described in the present invention.
Figures 3, 5A:
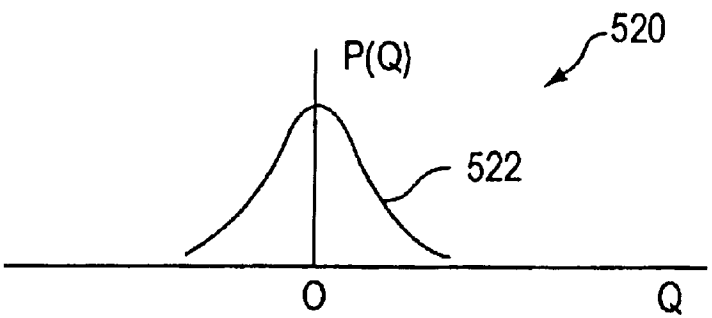
Figures 1, 5A:
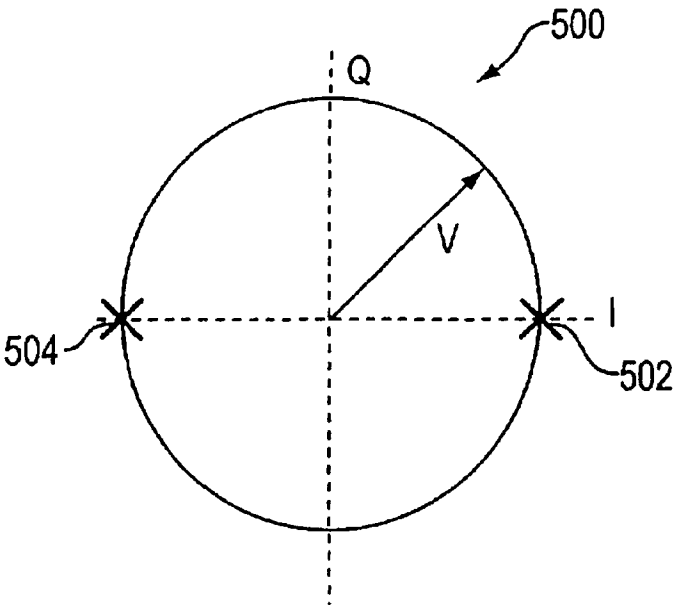
Figures 2, 5B:
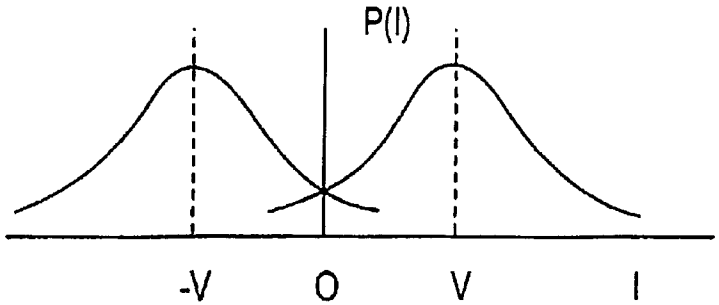
Figures 3, 5B:
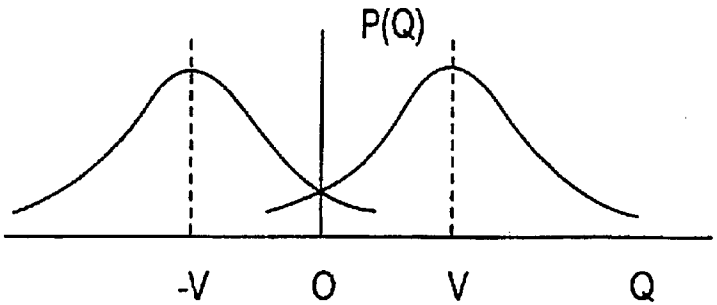
Figures 1, 5B:
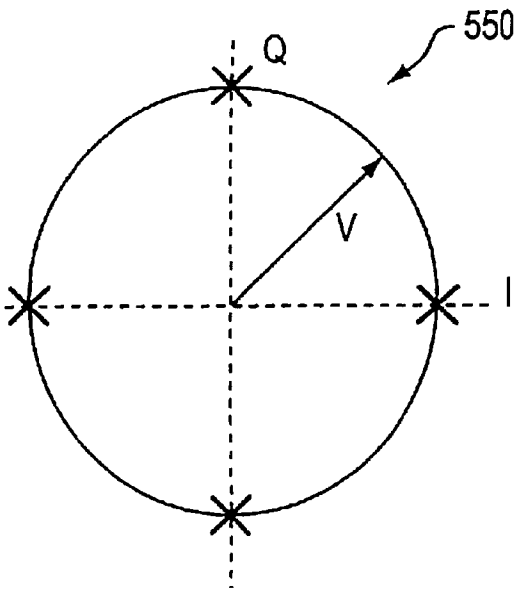
Figures 1, 5C:
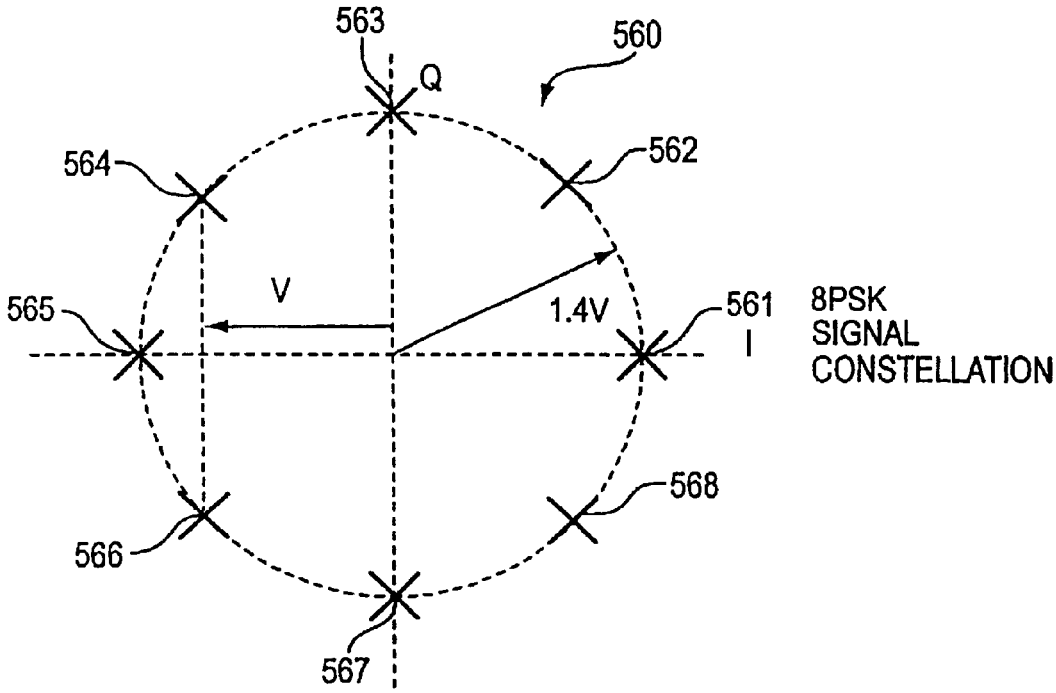
Figures 2, 5C:
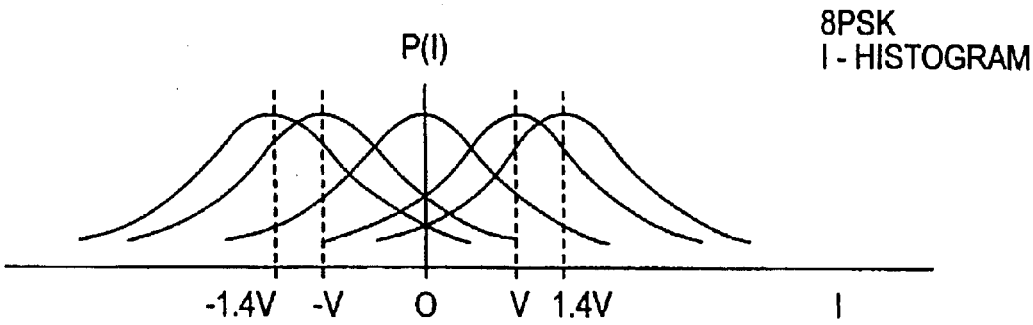
Figures 3, 5C:
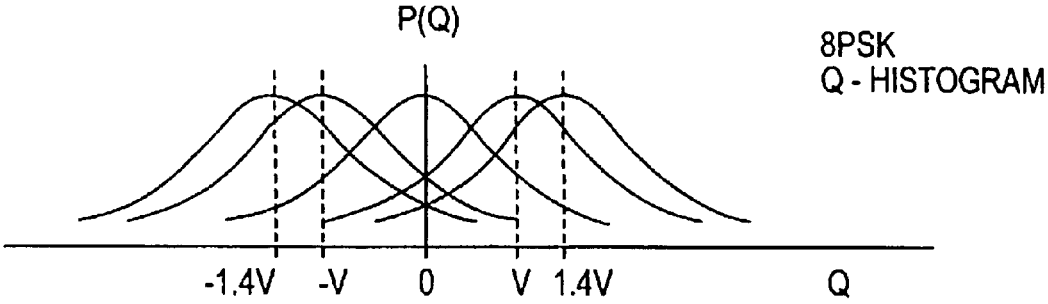

In the first means, the M-value is sensed by amplitude histogram analysis of the I and Q signals. I and Q amplitude histograms are constructed by dividing the total amplitude range of the I and Q signals into a predetermined number of amplitude bins and measuring, over a predetermined observation period, the probability of samples of the sampled signal falling in each bin. As in traditional probability estimation, the probability of a signal sample falling in an amplitude bin is the ratio of the number of samples that actually fall in a given amplitude bin, during a given observation period, to the total number of samples in the observation period. FIGS. 5(a)-5(c) show the signal constellations 500 for BPSK, 550 for QPSK, and 560 for 8PSK, corresponding respectively to M=2, 4 and 8. Also shown, for each signal constellation, are the expected I and Q amplitude histograms, P(I) and P(Q) respectively, representing the probability metrics described above, FIG. 5(a)-(c) show that the amplitude histograms are bell shaped and centered on the projected amplitudes of the signal constellation points on the I and Q axes. The curves are bell shaped owing to the amplitude distribution, or spread, caused by the combination of filtering and additive Gaussian noise. For BPSK, the bell curves are centered on points 516 and 518 in FIG. 5(a), corresponding to projected amplitudes of V and −V, respectively. The Q histogram 520 has a bell shaped curve 522 that is somewhat narrower than the corresponding I histogram curves 512 and 514 as the only contributing factor toward the amplitude spread is noise, there being no signal component in curve 522. Curve 522 is centered on a projected amplitude of null value as, for BPSK, the signal constellation points are contained solely on the I axis.

It is clear from the histograms of FIG. 5(a)-(c) that each value of M is associated with a distinct set of I and Q histogram shapes. In the absence of transmit filtering, unlimited channel bandwidth and zero additive noise power, the histograms would be impulse functions at the same locations on the absicca, or amplitude axis, as where the indicated bell-shaped histogram functions are centered, such as 516, 518, etc. As described above, the indicated histograms are bell shaped, rather than impulse functions, owing to the amplitude spread introduced by filtering and additive noise. Whereas a set of impulse functions are more distinguishable than a set of overlapping bell curves, for the destination signal to noise ratios of interest it is feasible, by pattern matching between the measured I and Q histograms and a set of theoretically expected reference histograms, such as those shown in FIG. 5(a)-(c), to correctly identify the transmit modulation order with high probability of success. A vindication of this claim follows from the fact that the demodulation process itself depends on being able to distinguish a particular signal constellation point, based on I and Q amplitudes, from all other signal constellation points.

Figure 6:
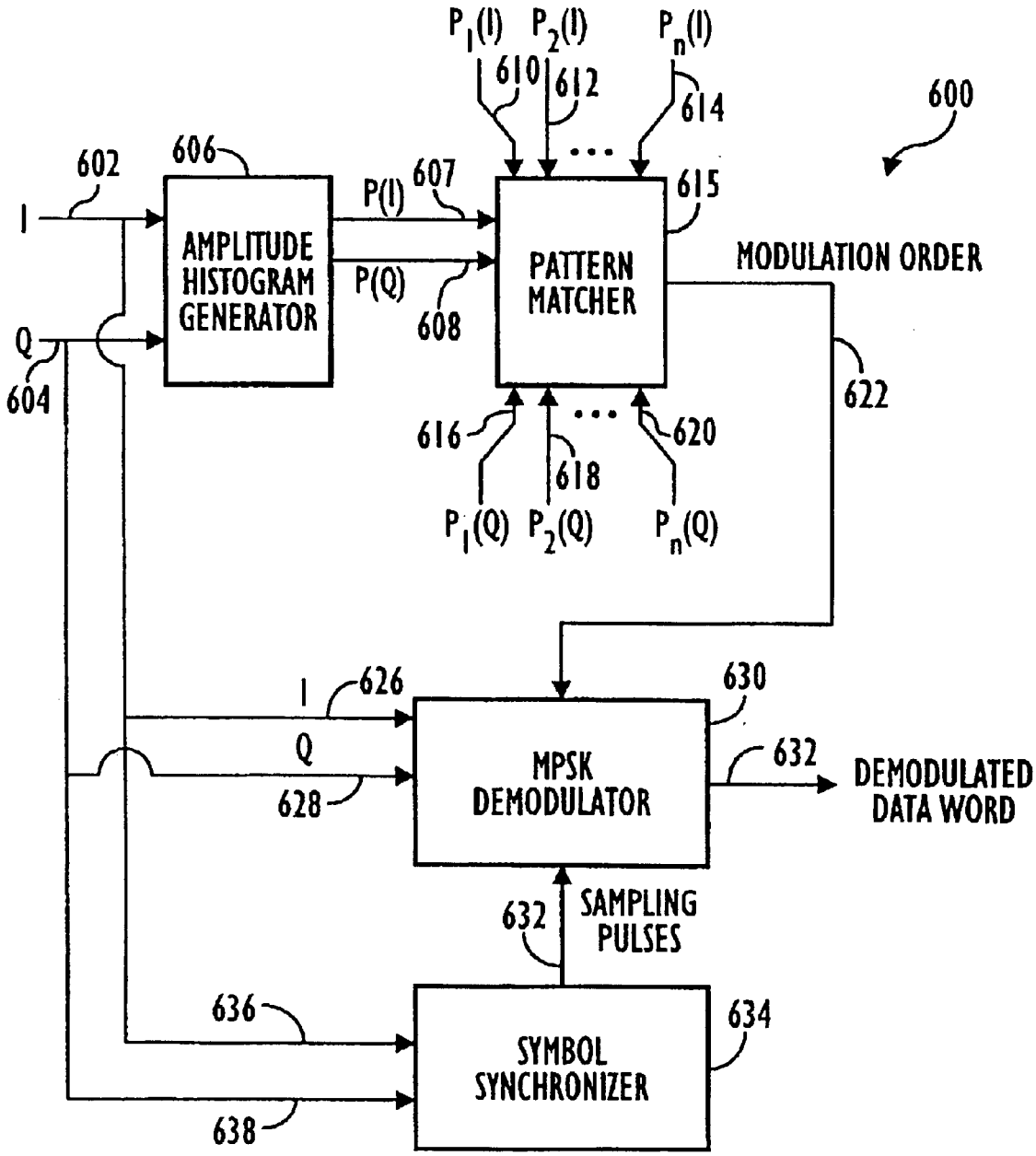
FIG. 6 shows one embodiment of a variable-modulation-order MPSK demodulator described in the present invention.

FIG. 6 shows a block diagram of a variable-modulation-order MPSK demodulator 660 based on the above described means of I and Q histogramming and histogram pattern matching. The received I and Q signals are input via lines 602 and 604 to a Amplitude Histogram Generator module 606, which calculates the I and Q histograms, P(I) and P(Q) respectively, as described above. P(I) and P(Q) are input via lines 607 and 608 to a Pattern Matcher module 615, wherein P(I) is correlated with one of n I-reference-histograms and P(Q) is correlated with one of n Q-reference histograms. In the above, n is given by $\log_2 M$, where M is the highest order in the MPSK modulation format. For example, where 8PSK is the highest modulation order, n=3. The n I-reference-histograms, $p_i(I)$, $p_2(I)$ . . . $p_n(I)$ are input to module 615 on lines 610, 612 . . . 614 respectively, whereas the Q-reference-histograms, $p_i(Q)$, $p_2(Q)$ . . . $p_n(Q)$ are input to module 615 on lines 616, 618 . . . 620 respectively. The output of the Pattern Matcher 615 is the modulation order, which is output on line 622 to a conventional MPSK demodulator 630. This demodulator 630 is fed by the same input I and Q signals as feeding the Amplitude Histogram Generator module 606. The I and Q signals are input to module 630 via input lines 626 and 628 and sampling pulses necessary for demodulation are input to module 630 via input line 632. The output from module 630 is a demodulated data word on line 632. The sampling pulses are provided to module 630 by a symbol synchronizer 634 with is also fed by the same input I and Q signals, as feeding modules 606 and 630, via input lines 636 and 638.

The second type of variable-modulation-order MPSK demodulator taught in this invention involves demodulating the received complex baseband signal with a conventional MPSK demodulator with M set to its highest value, which is 8 in the present embodiment. The demodulator attempts to determine, on a symbol-by-symbol basis, the best match between the tip of each received complex vector and a signal constellation point. Referring to FIG. 5(c), this corresponds to determining, on a maximum likelihood basis, which one of the 8 constellation points, 561, 562, 563, 564, 565, 566, 567, or 568 was transmitted. A decision favoring a particular point is considered a "hit" for that point. These signal constellation hits are averaged over a predetermined length of time, or observation period, which is much greater than one symbol period. The value of M is then indicated by the number of constellation points that have more hits than a threshold value. Only M=2, 4 and 8are allowed to further screen the results. This detected value of M is used in a conventional MPSK demodulator of known modulation order.

Figure 7:
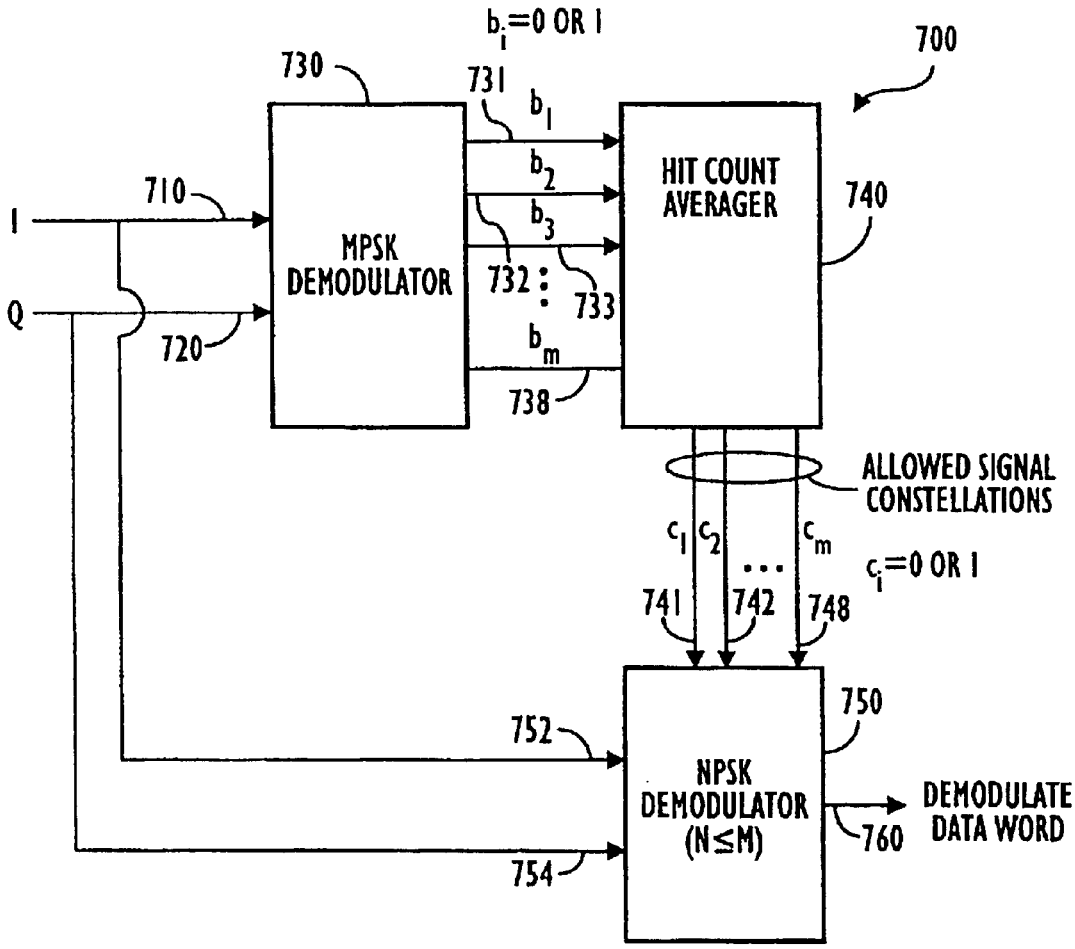
FIG. 7 shows a second embodiment of a variable-modulation-order MPSK demodulator described in the present invention.

FIG. 7 shows a block diagram of a second means 700 of demodulating variable-modulation-order MPSK signals. I and Q signals are input via lines 710 and 720 to a conventional MPSK. Demodulator 730, with M set to the highest allowable value, which is 8 in the preferred embodiment. As explained above, for each received symbol, one of the 8 constellation points 561-568 is hit. Eight parallel lines, 731, 732, 733 . . . 738, each corresponding to one constellation point, are output from module 730 and input to the Hit Count Average 740. The outputs $b_1$-$b_8$ on lines 731-738 are binary, having a value of 1 if the corresponding constellation point is hit and 0 if it is not hit. The Hit Count Averager 740 accumulates the values of each $b_i$ over a predetermined length of time, T. At the end of period T, module 740 decides which are valid constellation points based on the accumulated hit count for each $b_i$ exceeding a threshold value. The result is further screened by noting that only certain combinations of the 8 constellation points 561-568, constitute valid sets. The outputs of module 740 are also 8 lines, 741, 742, . . . 748, corresponding to the 8 constellation points 561, 562, . . . 568. If a constellation point is deemed valid by module 740, the value on the corresponding output line is set to the binary value of 1; otherwise it is set to the binary value of 0. The eight parallel outputs of module 740, carried on lines 741-748, comprise a vector $[c_1, c_2, \ldots c_M]$, which is input to a NPSK Demodulator 750, with less than or equal to M. The value of N, and the particular constellation points to be used, are given by the vector $[c_1, c_2, \ldots c_M]$. The signal inputs to the NPSK Demodulator 750, provided via lines 752 and 754, are the same I and Q signals as input to the MPSK Demodulator 730. The output of the NPSK Demodulator 750 is the demodulated data word provided via output line 760.

It is noteworthy that the variable demodulator 176 cannot determine the symbol rate and modulation format information from an interpretation of the received data as the sought information must be available before data demodulation is possible.

Figure 3:
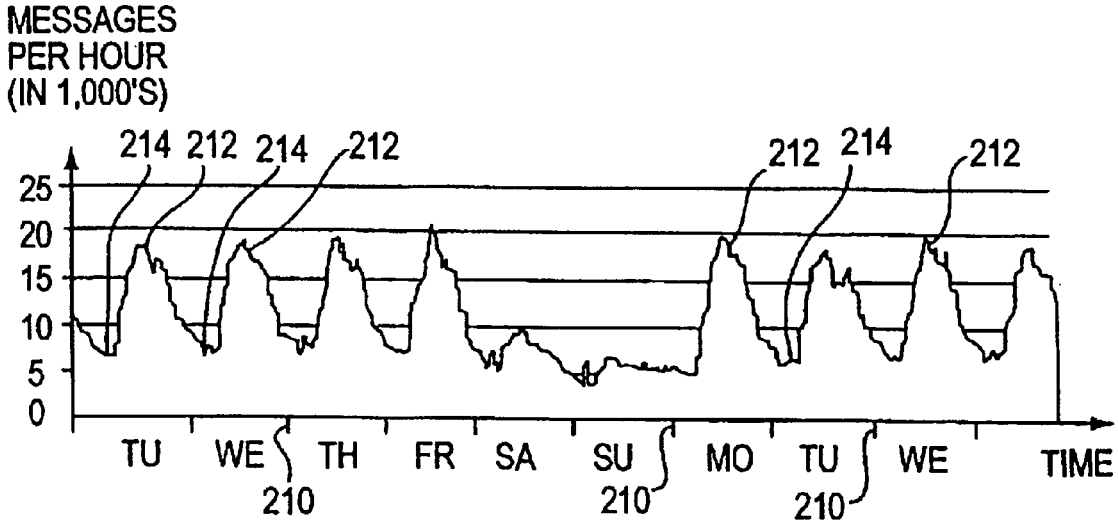
FIG. 3 is a computer-generated plot of actual message traffic with respect to time in a store-and-forward mobile satellite communication system.
Figure 4:
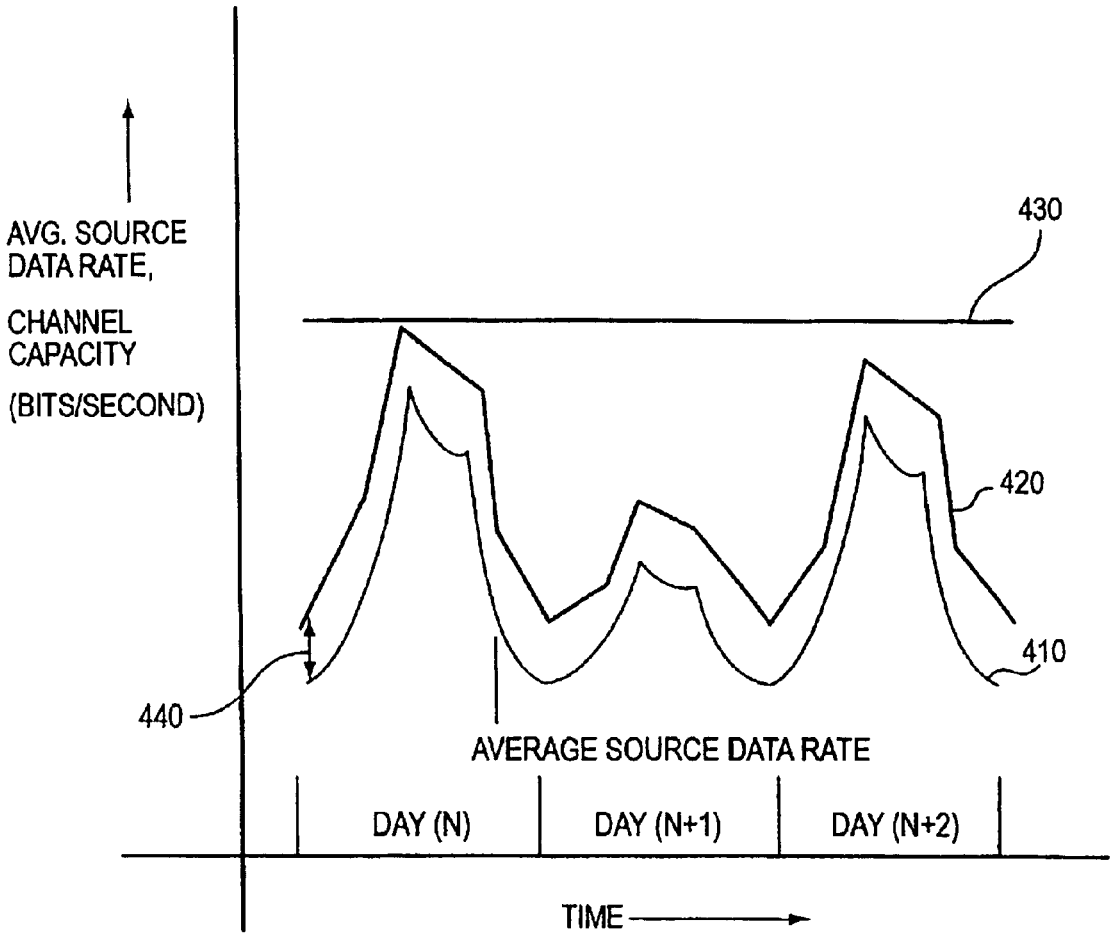
FIG. 4 is a conceptual graph of traffic loads relative to channel capacity, based on message traffic representative of that shown in FIG. 3 and channel capacity adjustments in accordance with the invention.

The advantages of the described features of the transmit subsystem 110 and the receive subsystem 170, and of transmitting data therewith are further described herein in reference to the graphics of FIGS. 2, 3 and 4, and the communication system diagram of FIG. 2.

FIG. 3 is a plot which shows, along its vertical axis, messages processed per hour in an operational satellite communication system, like the referred to communication system 100, in store-and-forward operations. The plot covers substantially a ten-day period with complete 24-hour periods beginning with a Tuesday (TU) and ending on a Wednesday (WE) of the following week, as shown along the horizontal axis of the plot. Midnight separating one day from the next is indicated by heavy vertical lines 210 along the horizontal (TIME) axis. The vertical axis has a scale which indicates typical system usage in messages per hour. The vertical scale is marked over a range from zero messages per hour to 25,000 messages per hour. The plot shows representative peak system traffic (shown at 212) during late morning hours of each plotted week day of 18,000 to 20,000 messages per hour, and representative traffic lows (shown at 214) after midnight of each week day of about seven thousand message per hour.

From the foregoing, it will be realized that any communication system operating with a fixed channel capacity cannot efficiently accommodate message traffic variations shown in FIG. 3. Paid for, but unused, channel capacity at the maximum power will exist during any time period of low traffic loads, whenever the transmit power of such system remains set to accommodate peak message loads at a fixed transmit data rate and modulation format.

FIG. 4 illustrates a primary object of this invention, which is to dynamically match the installed channel capacity to the time varying input traffic load. Curve 410 is an artist's illustration, modeled on actual data shown in FIG. 3, of typical diurnal traffic variations, including one non-busy day sandwiched between two busy days. The fact that non-busy days of the week come in pairs is beside the point here. The parameter plotted in curve 410 is the average source data rate, in units of bits/second, as described above. Channel capacity also has units of bits/second and is a function of the transmit power, modulation format, channel bandwidth, propagation loss and additive noise, as explained in the Background section. The aim of transmit power and modulation format adjustments, taught in this invention, is to dynamically match the installed channel capacity 420 to the average source data rate 410, while allowing for a prudent capacity margin 440. Such dynamic tracking of the input traffic with the installed capacity is economically attractive in satellite communication systems based on leased space segment capacity where the lease cost is partially based on the amount of satellite transponder power consumed. The horizontal straight line 430 is representative or prior art systems, where the installed capacity is inflexible and based on an estimate of the peak traffic load.

FIG. 8 shows modem curves, depicting bit error rate, BER, versus $E_b/N_0$ (dB), for MPSK and MDPSK, with M=2 to 32. The higher values of $E_b/N_0$ required for a given bit error rate, such as $10^{-3}$, and increasing values of M are evident from the curves. The values of $E_b/N_0$ required by MPSK at a BER of $10^{-3}$ are shown in the diagram. In practice, 1-2 dB performance margin must be allowed with respect to the curves shown in FIG. 8, which are theoretical, to allow for implementation losses.

From the above description of a preferred embodiment of the invention, it is realized that various changes and modifications can be made without departing from the scope and spirit of the invention. In particular, a less automatic operation of the channel capacity adaptation scheme taught here, but substantially utilizing the same adaptation rules, will be considered within the scope of this invention. The appended claims are intended to cover any and all such changes and modifications within the scope and spirit of the invention.

It is claimed:

1. In a method of data communications between a transmitter and a receiver, utilizing modulated radio frequency carriers having a modulation format including a symbol rate, and further utilizing a fixed bandwidth communication channel having a channel capacity, the said data communications occurring at a transmit data rate for data received by the transmitter as input data messages at an average source data rate, a method of dynamically adjusting the channel capacity, comprising the steps of:

changing the transmit data rate *corresponding to the channel capacity* in response to indicated changes in the average source data rate so as keep the transmit data rate marginally above the average source data rate with a margin that is substantially constant for all values of average source data rate; and changing the channel capacity in response to any change in the transmit data rate to maintain a ratio of signal energy per bit to a noise power spectral density at the receiver at a level at which a bit error rate at the receiver is maintained substantially at but below a threshold value, and wherein changes to the channel capacity are made through adjustments to the transmit power, symbol rate and modulation format.

*2. The method of claim 1, wherein the modulation format of the carrier is MPSK, and wherein the phase encoding is one of coherent and differential at a plurality of symbol rates and a plurality of modulation orders.*

*3. The method of claim 2, wherein the modulation format adjustment includes adjusting the modulation order.*

*4. The method of claim 1, wherein the receiver is able to determine the symbol rate.*

*5. The method of claim 1, wherein the receiver is able to determine a modulation order.*

*6. The method of claim 5, wherein receiver determines the modulation order by performing the steps of:*

*performing an amplitude histogram of the inphase (I) and quadrature (Q) complex baseband samples of the receive signal; and*

*selecting a particular modulation order through pattern matching between the receive signal histograms and a set of reference histograms.*

*7. The method of claim 5, wherein receiver determines the modulation order by performing the steps of:*

*demodulating the receive signal with an MPSK demodulator of the highest permitted modulation order;*

*recording the average number of signal constellation hits over a predetermined length of time; and*

*identifying constellation points that have been transmitted based on the steps of demodulating and recording.*

*8. The method of claim 1, wherein the transmitter and the receiver are in a store-and-forward communication system of messages having a determinable length and received in intervals at message arrival times, the method further comprising the steps of:*

*determining an average source data rate based on counting the total length of all messages received in a predetermined period of time; and*

*determining the level of current data traffic based on the average source data rate.*

*9. The method of claim 1, further comprising the steps of:*

*temporarily suspending changing the transmit data rate in response to changes in data traffic levels;*

*increasing the transmit data rate to a maximum established transmit data rate during a period when a*

*message of urgency is received for transmission by the transmitter and transmit data rate is not already at such maximum established transmit data rate;*

*increasing the channel capacity to a maximum allocated level commensurate and simultaneously with any such increase in the transmit data rate.*

*10. The method of claim 1, further comprising the steps of:*

*temporarily suspending changing the transmit data rate in response to changes in data traffic levels;*

*decreasing the transmit data rate to a predetermined minimum transmit data rate during a period when a power reserve indicator signals that resources for operating the transmitter have become limited and the transmit data rate is not already at such predetermined minimum established transmit data rate; and*

*decreasing the transmit power to a minimum transmit power level commensurate and simultaneously with any such decrease in the transmit data rate to the predetermined transmit data rate whereby consumption of the limited power resources is reduced.*

* * * * *